3,226,295
METHOD OF MAKING CETYL ALCOHOL EMULSIONS
Carlos C. Goetz, Luiz-Bivar 36–5E, Lisbon, Portugal, and Paul C. Goetz, 83–A Ionia Terrace, East Paterson, N.J.
No Drawing. Filed Feb. 8, 1960, Ser. No. 7,103
2 Claims. (Cl. 167—63)

This invention relates to micron sized higher solid waxy alcoholic particles, compositions, emulsions, dispersions thereof and therewith and methods of making said particles.

The invention is a continuation-in-part and an improvement over pending U.S. application Ser. No. 795,351, filed February 25, 1959, now abandoned.

The invention relates generally to a powder comprising critically sized particles of cetyl alcohol and/or one of the other normally solid waxy alcohols and to compositions thereof in cosmetic, therapeutic, pharmaceutical, soap, detergent, coating, preservative and other compounds.

Although cetyl alcohol is the preferred waxy alcohol for the purposes disclosed, the invention has within its intended purview the use of other normally solid waxy alcohols having from fourteen carbon atoms to thirty carbon atoms, such as octadecanol, stearyl alcohol $$(C_{18}H_{36}OH)$$

margaryl alcohol ($C_{17}H_{35}OH$), and nonadecyl alcohol.

As is generally known, the melting point rises as the molecular weight of these saturated, normal, monohydric alcohols increases. Unsaturated branched chain alcohols may be used preferably if their molecular weight is sufficiently high to make them solids at room temperature. In general, solid higher fatty alcohols, or long chain aliphatic alcohols, or wax alcohols, are employed, the melting point being governed by the use to which the powder is to be part.

In view of the past recognized and efficacious use of cetyl alcohol or other property related alcohols mentioned per se and as a component or a distributor in compositions, applicants have sought reasons for lack of maximum effect and for relatively small percentage thereof in compositions as for therapeutic purposes, drug preparations, coatings, detergents, soaps, salves, creams, cosmetics, germicides, disinfectants, and for other preparations.

Applicants have found in the art that dispersions containing cetyl alcohol or other alcohols mentioned such as ointments had approximately a 2% to 7% percentage; a shampoo had about 10%; other products have utilized emulsifiers for dispersing the cetyl alcohol with resultant diminution and adulteration of the cetyl alcohol content.

Accordingly, resultant and continued experimentation has proved that the micron size of the alcoholic particle is a critical consideration for self-emulsification in water, and for increased activity in powder and composition form.

With the micron sizes below 20 or 15, it is found that the alcohol in powder and also emulsion forms is more rapidly and thoroughly absorbed by the skin. Its therapeutic value has been found to be of improved value to skin conditioning, healing of infections by external application, and to therapy.

It is known that washing with water and soap has a tendency to degrease the skin. Syndromes develop and in extreme cases the cells and nerve endings become positively affected; pathological conditions result with muscular affectation, irritation and even general debility. Human skin, covering the whole body, has a high over-all effect on general body functions.

Present day skin lotions do not seem to be the answer to skin health. The body throws off "Vaseline" (related to petroleum and paraffin) when used in lotion or per se since it is alien to the body. Other ingredients based on animal and vegetable fats and oils are equivalent to foodstuff constituents and are consequently not skin retained or focused. The application of lanolin for use on the skin is inappropriate because of its stickiness.

Higher alcohols stand chemically between the "vaselines" and the animal and or vegetable fats in the fine dispersions made possible by micron size up to 20. Such dispersions have no waxy feeling and have high skin compatibility. Moreover, the alcohol of such micron size serves as exceedingly, high performing carriers for disinfectants, therapeutical agents, perfumes and other compositions either in emulsion or dry form.

In the alcohols (including cetyl alcohol) of micron sizes involved in this invention, emulsions of substantially pure alcohol in water have been formed, with the alcohol comprising of the total weight approximately from 18%–40%.

In the application of a finely divided alcohol of the invention such as cetyl alcohol to conventional soap, the alcohol compensates for the degreasing effect by replacement thereof. Addition of paraffin seems to improve the effectiveness of such cetyl alcohol soap for washing and cleaning purposes.

In preparing the preparation of the cetyl alcohol of the sizes involved the following steps were taken:

60 grams of pure cetyl alcohol, 0.15 gram of stearic acid and 0.675 gram of triethanolamine were heated with 150 mils of water beyond the melting point of the cetyl alcohol and emulsified as by stirring in a "Waring Blendor" while the alcohol was still in molten condition. After one minute a shock cooling operation was affected as by introduction of 200 grams of ice for rapid cooling down to approximate room temperature. The mixture was then filtered through filter paper and the residue water-washed. The result drained to a condition with about a 40% solid content. Thereafter water was added and the mass homogenized to make about a 25% cetyl alcohol content resulting in a smooth cream.

It is seen from the above that the cetyl alcohol content formed 98.54% of the original non-aqueous component with a limit of substantially 100% by the maximum washing away of the triethanolamine and triethanolamine stearate.

The dispersion above produced is white, soft and smooth to the touch. When rubbed on the skin, it gives a cooling and soothing effect, the excess being easily washed or rubbed off. The dispersion has good results on leather (animal matter) making same soft and pliable, as well as on other surfaces requiring modification of optical and preservative aspects.

The particle size of the cetyl alcohol prepared as above is from 3 to 15 microns and is measurable by putting a drop between two microscope slides, rubbing them slightly and then microscopically judging the particle size.

When cetyl alcohol of larger micron size as above 25 or even 20 (as measured by above microscope method) is applied to the skin, it is not well absorbed.

The above 40% or 18% mixture is capable of being air-dried to a hard cake; and when softly crushed, powder of fine particles results. Although the fine particles have a tendency to somewhat cling together, nevertheless, when stirred with water they easily give a strong, novel and stable emulsion.

Thus, by utilizing the micronized alcohol of the invention herein, a substantially water and self-emulsifiable alcohol has been produced having extraordinary and unexpected therapeutic and soothing effects.

The 40% and 18% solid content of cetyl alcohol dispersion in water as above described is suitable to form the base for compositions heretofore mentioned whereby a cetyl alcohol content has been inordinately increased from the small perecntages mentioned to values up to 40% with concomitant and increased if not new function. Perfumes, drugs, soaps and detergents, pharmaceuticals, lotions, creams, salves and coating compositions may not only embody the water dispersion above stated, but also the powder in any selective proportions. Other agents may be added for producing and maintaining states of aggregation and dispersion including emulsifying and wetting agents.

In the method of production above outlined, the amount of emulsifier seemed to be critical. Good filterable emulsions were obtained with 250 mils of water, same amount of ice, 60 grams of cetyl alcohol, .4 to 3.0 mils triethanolamine and .1 to .24 gram of stearic acid. However, with less stearic acid, the product was gritty, and with more stearic acid, filtration was too slow or none at all. When octadecanol was used instead of cetyl alcohol, there resulted frequently a gritty product. Only when 30 grams of octadecanol, .3 mil of triethanolamine and .15 to .5 gram of stearic acid was the end product acceptable.

Since the filing of pending application Ser. No. 795,351 hereinbefore mentioned, it was found that unfilterable emulsions become filterable if they are frozen and then filtered and/or washed while thawing out. Such washing during the thawing period slowly removes the emulsifying agents and delays reemulsification.

By the freezing procedure, it was found that increase in the amount of emulsifier resulted in smaller particle size, namely down to 1 micron and lower, 1 micron being the limit of visibility by use of conventional measuring devices. In some cases Brownian movement was observed.

It seems that freezing frees the water out of the emulsified particles, and that at the low temperature, time is required before re-emulsification takes place. In the meantime, the bulk of the liquid and emulsifiers can be drained off and the residue further washed. This accounts for use of increased amount of emulsifier. Thus, for 40 to 60 grams of cetyl alcohol, .6 to 1.5 mils of triethanolamine and 1.0 to 1.5 grams of stearic acid may be used.

Moreover, stronger emulsifiers are feasible with octadecanol such as monoethanolamine, oleic acid and even sodium lauryl sulphate. A successful formulation has been developed utilizing the heating, emulsifying, shock cooling and freezing procedures involving 30 grams of octadecanol, 10.0 mils of monoethanolamine, .45 mil of oleic acid and 240 mils of tap water. Particles below 3 microns with an average of 1.5 microns resulted.

In other tests, 30 grams of octadecanol, 15 mils of monoethanolamine, 6 grams of sodium lauryl sulphate, 250 mils of water and 1 drop of oleic acid were mixed while hot for emulsification in a blender to which 250 grams of ice were added to shock cool. The resultant was then frozen in a pan, then removed and washed down in a vessel while said resultant was in floating condition on the washing water in the vessel until the pH value was essentially neutral below 8.4, and then filtered and homogenized. Creams from 35% to 12% strength thus were made with particle size of 1.5 micron average and lower.

If still more emulsifier is used (maintaining the freezing method as described in the prior paragraph), the product can only be filtered to 5% of total solids in view of the gel-like state of aggregation and in view of the fact that the gel retains the water mechanically. In such case, one can deemulsify by adding a small amount of alum in the equivalence of about 1% $Al_2O_3$ of the weight of octadecanol present. Instead of alum, magnesium salts may also be used.

Instead of using alum for de-emulsification, magnetisum salts may be added at various stages in cream manufacture. It is advantageous to add such salts to the washed product. However, one can also de-emulsify by adding a soapy compound as sodium oleate and then a magnesium or aluminum salt.

Thus, when using the magnesium salt on the fresh emulsion before freezing, for each 10 grams of octadecanol of the formulation involving 30 grams of octadecanol above described, 14 grams of $MgSO_4 \cdot 6H_2O$ were used.

In the same formulation of 30 grams of octadecanol and applied to the emulsion after freezing, washing and filtering, for each 10 grams of octadecanol 2.5 grams of $MgSO_4 \cdot 6H_2O$ were used.

And in the same formulation of 30 grams of octadecanol and applied to the emulsion after freezing, washing and filtering, for each 10 grams of octadecanol .5 gram of sodium oleate and .3 gram of $MgSO_4 \cdot 6H_2O$ were used.

In the treatment of the preceding paragraph a magnesium oleate precipitate of less than .5 gram or 5% of the octadecanol results.

By the above de-emulsification treatments, alcohol particles of sizes less than 1 micron have been obtained.

For arriving at a dry powder it has been found that water removal may be effected by displacing said water with dioxene and then air drying.

Octadecanol after water removal forms lumps which can be comminuted with slight pressure to attain micron size (high pressure causes caking); or the lumps can be broken up by adding kerosene solvents for non-vital surface application purposes such as leather, paintings, prints, wood and the like wherein the particles are in small micron size and the kerosene serves as a volatilizing vehicle. In a kerosene vehicle, the kerosene evaporates and a uniform alcohol film comprised of small micron-sized particles remains without contaminating or affecting either chemically or physically the film supporting surface.

The finer the particle size of the alcohols under discussion, the better the absorption by the skin and more stable, more uniform, better and more effective distribution thereof results in the various compositions and states of aggregation disclosed. Brownian movement as has been mentioned was observed in the emulsion form. Thus, increase in concentration of the alcohol is not accompanied by danger of deposition; and with increase of concentration, more favorable effects result in the therapeutic, detergent and other fields of application.

Smaller particle size not only permits higher concentrations thereof, but even in lower concentrations, compositions containing the alcohol ingredient whether aqueous or otherwise are more effective because of more uniform distribution and better penetration than hitherto higher concentrations with alcohol particles of the larger sizes.

The cream formed by homogenization of the micronized alcohol emulsion of the invention herein resembles in its general attributes Dr. Bunting's secret formula of his base in the "Noxzema" product manufactured by the Noxzema Chemical Co. of Baltimore, Maryland. And similarly, the ingredients added in "Noxzema" such as menthol, camphor, clove oil, eucalyptus oil, carbolic acid and lime water may also be added to the cream of applicants' alcohol emulsion.

To maintain emulsion form the lower limit of micron size of the alcohols in the invention is 0.1.

It is understood that minor changes and variations in the methods disclosed, in the materials, proportions and uses of the invention may all be resorted to without departing from the spirit of the invention and the scope of the appended claims.

We claim:

1. In a process of producing an aqueous emulsion consisting of cetyl alcohol with water, said alcohol being of particle size of between 1.5 microns to 0.1, the steps of emulsifying the said alcohol in hot water with an emulsifying agent, rapidly cooling the emulsion to near freezing, filtering the same and washing the filter residue until all emulsifying agent is removed.

2. In a process of producing an aqueous emulsion consisting of cetyl alcohol with water, said alcohol being of particle size of between 1.5 microns to 0.1, the steps of emulsifying the said alcohol with an emulsifying agent in hot water, freezing the emulsion to form ice cakes, washing and thawing the ice cakes whereby the emulsifying agent is slowly freed under constant dilution, carrying away the freed emulsifying agent, and continuing the washing until the emulsifying agent is removed from the mixture.

References Cited by the Examiner

UNITED STATES PATENTS

| | | | |
|---|---|---|---|
| 2,045,415 | 6/1936 | Schrauth | 167—63 |
| 2,446,757 | 8/1948 | Goetz | 167—92 X |
| 2,675,343 | 4/1954 | Clymer et al. | 167—63 |
| 2,898,269 | 8/1959 | Felleschin | 167—63 |

OTHER REFERENCES

ARIC, Technique of Beauty Products, Leonard Hill, Ltd. (1949), pp. 81–84.

Axon: Journal of Pharmacy and Pharmacology, vol. 9, No. 12, pp. 889 to 899, December 1957.

Bulletino Chemico Farmaceutico, vol. 90 (1951), pp. 75–77.

Flosdorf: Freeze-Drying, Reinhold Publ. Corp., N.Y. (1949), pp. 14–18 and 112.

Martindale: Extra Pharmacopocia, The Pharmaceutical Press, London (1941), vol. 1, 22nd ed., pp. 787–788.

Remington: Practice of Pharmacy, 9th ed., Mack Publ. Co., Easton, Pa. (1948), pp. 169 and 176.

LEWIS GOTTS, *Primary Examiner.*

SAM ROSEN, WILLIAM B. KNIGHT, MORRIS O. WOLK, IRVING MARCUS, *Examiners.*